United States Patent
Kano et al.

(10) Patent No.: US 10,022,945 B2
(45) Date of Patent: Jul. 17, 2018

(54) ANTIFOGGING AGENT COMPOSITION AND ANTIFOGGING ARTICLE USING SAME

(71) Applicant: NOF Corporation, Tokyo (JP)

(72) Inventors: Takamitsu Kano, Aichi (JP); Dai Tsuruoka, Aichi (JP); Yasushi Sugihara, Aichi (JP)

(73) Assignee: NOF Corporation, Tokyo (JP)

( * ) Notice: Subject to any disclaimer, the term of this patent is extended or adjusted under 35 U.S.C. 154(b) by 17 days.

(21) Appl. No.: 15/507,581

(22) PCT Filed: Sep. 8, 2015

(86) PCT No.: PCT/JP2015/075382
§ 371 (c)(1),
(2) Date: Feb. 28, 2017

(87) PCT Pub. No.: WO2016/047430
PCT Pub. Date: Mar. 31, 2016

(65) Prior Publication Data
US 2017/0282512 A1 Oct. 5, 2017

(30) Foreign Application Priority Data

Sep. 22, 2014 (JP) ................ 2014-1 92217

(51) Int. Cl.
| | | |
|---|---|---|
| *C09K 3/18* | (2006.01) | |
| *B32B 27/30* | (2006.01) | |
| *B32B 27/40* | (2006.01) | |
| *C09D 5/16* | (2006.01) | |
| *C09D 133/14* | (2006.01) | |
| *C09D 133/26* | (2006.01) | |
| *C09D 175/04* | (2006.01) | |
| *C09K 3/00* | (2006.01) | |
| *C03C 17/32* | (2006.01) | |
| *C09D 133/06* | (2006.01) | |

(52) U.S. Cl.
CPC ............. *B32B 27/30* (2013.01); *B32B 27/40* (2013.01); *C03C 17/322* (2013.01); *C09D 5/16* (2013.01); *C09D 133/066* (2013.01); *C09D 133/14* (2013.01); *C09D 133/26* (2013.01); *C09D 175/04* (2013.01); *C09K 3/00* (2013.01); *C09K 3/18* (2013.01)

(58) Field of Classification Search
CPC ...... C03C 17/322; C09D 5/16; C09D 5/1668; C09D 133/066; C09D 133/14; C09D 133/26; C09D 175/04; C09K 3/18
See application file for complete search history.

(56) References Cited

FOREIGN PATENT DOCUMENTS

| | | |
|---|---|---|
| JP | H0834971 A | 2/1996 |
| JP | 2002220781 A | 8/2002 |
| JP | 2008150454 A | 7/2008 |
| JP | 2010150351 A | 7/2010 |
| JP | 2012007033 A | 1/2012 |
| WO | WO-2006019175 A1 | 2/2006 |

OTHER PUBLICATIONS

International Search Report in International Application No. PCT/JP2015/075382, filed Sep. 8, 2015.

*Primary Examiner* — Edward J Cain
(74) *Attorney, Agent, or Firm* — Saliwanchik, Lloyd & Eisenschenk

(57) ABSTRACT

To provide an antifogging agent composition having excellent sustainability of antifogging performance.
An anti fogging agent composition includes a copolymer (A), a polyfunctional blocked isocyanate compound (B), and a surfactant (C). The copolymer (A) is formed of 35 to 90 parts by weight of the monomer (A-1), 5 to 60 parts by weight of the monomer (A-2), and 5 to 30 parts by weight of the monomer (A-3) per 100 parts by weight of the copolymer (A). An NCO/OH ratio obtained by dividing an isocyanate group content (NCO) of the polyfunctional blocked isocyanate compound (B) by a hydroxyl group content (OH) of the copolymer (A) is within a range from 0.1 to 1.5. The surfactant (C) includes 1.00 to 10.0 parts by weight of the anionic surfactant (C-1) and 0.01 to 3.00 parts by weight of the cationic surfactant (C-2) per 100 parts by weight of the copolymer (A).

4 Claims, No Drawings

ANTIFOGGING AGENT COMPOSITION AND ANTIFOGGING ARTICLE USING SAME

CROSS-REFERENCE TO RELATED APPLICATIONS

This application is the U.S. national stage application of International Patent Application No. PCT/JP2015/075382, filed Sep. 8, 2015, which claims priority to Japanese Application No. 2014-192217, filed Sep. 22, 2014, the disclosures of each of which are incorporated herein by reference in their entirety.

TECHNICAL FIELD

The present invention relates to an antifogging agent composition having excellent antifogging performance and an antifogging article using the same.

BACKGROUND ART

A lighting apparatus such as a headlight of an automobile is configured so that a transparent member formed of glass, plastic, or the like, is placed in front of a light source and light emitted from the light source is applied to the outside via the transparent member. In such a lighting apparatus, for example, in the case where the inside of the transparent member is fogged, the intensity of irradiation light is reduced and the aesthetic appearance of irradiation light is spoiled in some cases.

In Patent Literature 1, an antifogging agent composition that can be used for preventing the above-mentioned lighting apparatus from being fogged is disclosed. This antifogging agent composition contains the following components.

Monomer (A): non-crosslinked water-soluble vinyl-based monomer

Monomer (B): non-crosslinked non-water-soluble vinyl-based monomer

Monomer (C): vinyl-based monomer having a hydroxyl group

Cross-linking agent (D) having an isocyanate group

Surfactant (E)

The antifogging agent composition described in Patent Literature 1 can achieve antifogging performance on the basis of the properties of the monomer (A), favorable adhesiveness and water resistance on the basis of the properties of the monomer (B), and favorable antifogging performance on the basis of the function of the surfactant (E).

Patent Document 1: Japanese Patent Application Laid-open No. 2010-150351

SUMMARY OF INVENTION

Problem to be Solved by the Invention

In an antifogging film obtained from the antifogging agent composition described in Patent Literature 1, the surfactant (E) gradually flows out when the antifogging film is used as, for example, a headlight of an automobile used in an environment where condensation repeatedly occurs. Therefore, in an antifogging article using the antifogging agent composition described in Patent Literature 1, antifogging performance (water film forming properties) is reduced along with the use in some cases.

In view of the circumstances as described above, it is an object of the present invention to provide an antifogging agent composition having excellent sustainability of antifogging performance and an antifogging article using the same.

Means for Solving the Problem

In order to achieve the above-mentioned object, an antifogging agent composition according to an embodiment of the present invention includes a copolymer (A); a polyfunctional blocked isocyanate compound (B); and a surfactant (C).

The copolymer (A) is formed of a monomer (A-1) represented by a following general formula (1) or (2), a monomer (A-2) represented by a following general formula (3), and a monomer (A-3) represented by a following general formula (4) or (5).

[Chem. 1]

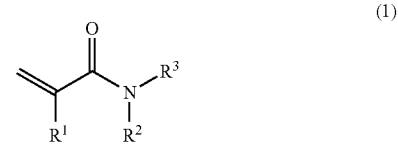

(1)

(In the general formula (1), $R^1$ represents a hydrogen atom or a methyl group, $R^2$ represents a $C_1$ to $C_4$ straight chain or branched alkyl group, $-C(CH_3)_2CH_2COCH_3$, $-C_2H_4N(CH_3)_2$, or $-C_3H_6N(CH_3)_2$, and $R^3$ represents a hydrogen atom or a $C_1$ to $C_4$ straight chain or branched alkyl group)

[Chem. 2]

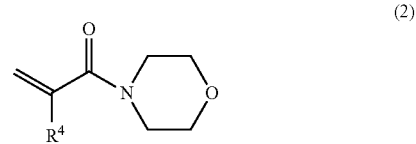

(2)

(In the general formula (2), $R^4$ represents a hydrogen atom or a methyl group)

[Chem. 3]

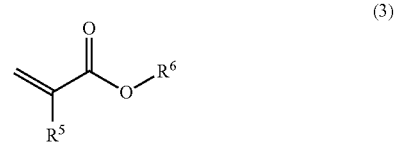

(3)

(In the general formula (3), $R^5$ represents a hydrogen atom or a methyl group and $R^6$ represents a $C_1$ to $C_{16}$ straight chain, branched, or cyclic alkyl group)

[Chem. 4]

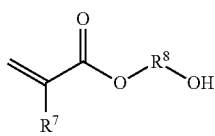

(4)

(In the general formula (4), $R^7$ represents a hydrogen atom or a methyl group and $R^8$ represents a $C_2$ to $C_4$ straight chain or branched alkylene group or $-C_2H_4(OCO(CH_2)_5)n-(n=1 \text{ to } 5)$)

[Chem. 5]

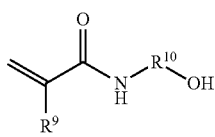

(5)

(In the general formula (5), $R^9$ represents a hydrogen atom or a methyl group and $R^{10}$ represents a $C_1$ to $C_4$ straight chain or branched alkylene group)

A content of the monomer (A-1) is 35 to 90 parts by weight, a content of the monomer (A-2) is 5 to 60 parts by weight, and a content of the monomer (A-3) is 5 to 30 parts by weight per a total content of 100 parts by weight of the monomer (A-1), the monomer (A-2), and the monomer (A-3).

An NCO/OH ratio obtained by dividing an isocyanate group content (NCO) of the polyfunctional blocked isocyanate compound (B) by a hydroxyl group content (OH) of the copolymer (A) is within a range from 0.1 to 1.5.

The surfactant (C) includes an anionic surfactant (C-1) and a cationic surfactant (C-2), a content of the anionic surfactant (C-1) being 1.00 to 10.0 parts by weight per 100 parts by weight of the copolymer (A), a content of the cationic surfactant (C-2) being 0.01 to 3.00 parts by weight per 100 parts by weight of the copolymer (A).

With this configuration, by using the anionic surfactant (C-1) and the cationic surfactant (C-2) together, the surfactant is made less likely to flow out due to water generated by condensation and the like. Therefore, in this antifogging agent composition, antifogging performance (water film forming properties) is less likely to be reduced along with the use and excellent antifogging performance is maintained.

The anionic surfactant (C-1) may be a fluorochemical surfactant.

With this configuration, it is possible to favorably reduce the surface tension of water.

An antifogging article according to an embodiment of the present invention includes a substrate; and an antifogging film.

The antifogging film is formed by heating and curing the antifogging agent composition applied to the substrate.

With this configuration, an antifogging article including a formed antifogging film in which antifogging performance (water film forming properties) is less likely to be reduced along with the use and excellent antifogging performance is maintained can be achieved.

Advantageous Effects of Invention

It is possible to provide an antifogging agent composition and an antifogging article that have excellent sustainability of antifogging performance.

MODE(S) FOR CARRYING OUT THE INVENTION

Hereinafter, an embodiment of the present invention will be described.

An embodiment of the present invention relates to, for example, a technique for providing an antifogging film on a surface of a substrate to which antifogging performance is given, such as a transparent member used for a headlight of an automobile and the like. The antifogging film according to this embodiment is formed by heating and curing an antifogging agent composition that is a mixture of a plurality of types of materials. The ingredients of the antifogging agent composition are determined so that favorable sustainability of antifogging performance can be achieved in the antifogging film after thermal curing.

[Antifogging Agent Composition]

The antifogging agent composition according to this embodiment includes a copolymer (A), a polyfunctional blocked isocyanate compound (B), and a surfactant (C).

(Surfactant (C))

In this antifogging agent composition according this embodiment, as the surfactant (C), an anionic surfactant (C-1) and a cationic surfactant (C-2) are used together. In this configuration, an anion of the anionic surfactant (C-1) and a cation of the cationic surfactant (C-2) form an ion pair. Accordingly, the anionic surfactant (C-1) and the cationic surfactant (C-2) are made less likely to flow out due to water generated by condensation and the like.

Therefore, in an antifogging film obtained from the antifogging agent composition according to this embodiment, antifogging performance (water film forming properties) is less likely to be reduced along with the use and excellent antifogging performance is maintained thanks to the effects of the anionic surfactant (C-1) and the cationic surfactant (C-2).

When the anionic surfactant (C-1) is a fluorochemical surfactant, higher antifogging performance can be achieved because surface tension of water can be favorably reduced in an antifogging film obtained from the antifogging agent composition.

The content of the anionic surfactant (C-1) is favorably within the range from 1.00 to 10.00 parts by weight per 100 parts by weight of the copolymer (A). When the content of the anionic surfactant (C-1) is less than 1.00 parts by weight, sustainability of antifogging performance in the antifogging film is reduced and antifogging performance after a heat resistance test is reduced. On the other hand, when the content of the anionic surfactant (C-1) exceeds 10.00 parts by weight, a stain of a water drip becomes conspicuous in the antifogging film.

The content of the cationic surfactant (C-2) is favorably within the range from 0.01 to 3.00 parts by weight per 100 parts by weight of the copolymer (A). When the content of the cationic surfactant (C-2) is less than 0.01 parts by weight, sustainability of antifogging performance in the antifogging film is reduced. On the other hand, when the content of the anionic surfactant (C-1) exceeds 3.00 parts by weight, a stain of a water drip becomes conspicuous in the antifogging film.

(Copolymer (A))

The copolymer (A) is formed of a monomer (A-1), a monomer (A-2), and a monomer (A-3). The monomer (A-1) is represented by the following general formula (1) or (2). The monomer (A-2) is represented by the following general formula (3). The monomer (A-3) is represented by the following general formula (4) or (5).

[Chem. 6]

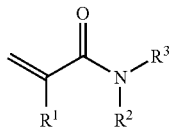

(1)

In the general formula (1), $R^1$ represents a hydrogen atom or a methyl group, $R^2$ represents a $C_1$ to $C_4$ straight chain or branched alkyl group, $-C(CH_3)_2CH_2COCH_3$, $-C_2H_4N(CH_3)_2$, or $-C_3H_6N(CH_3)_2$, and $R^3$ represents a hydrogen atom or a $C_1$ to $C_4$ straight chain or branched alkyl group.

[Chem. 7]

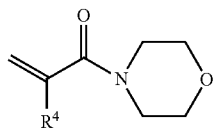

(2)

In the general formula (2), $R^4$ represents a hydrogen atom or a methyl group.

[Chem. 8]

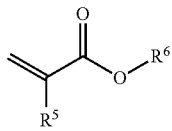

(3)

In the general formula (3), $R^5$ represents a hydrogen atom or a methyl group and $R^6$ represents a $C_1$ to $C_{16}$ straight chain, branched, or cyclic alkyl group.

[Chem. 9]

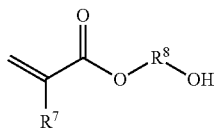

(4)

In the general formula (4), $R^7$ represents a hydrogen atom or a methyl group and $R^8$ represents a $C_2$ to $C_4$ straight chain or branched alkylene group or $-C_2H_4(OCO(CH_2)_5)n-(n=1$ to 5).

[Chem. 10]

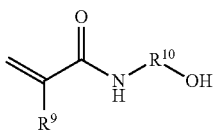

(5)

In the general formula (5), $R^9$ represents a hydrogen atom or a methyl group and $R^{10}$ represents a $C_1$ to $C_4$ straight chain or branched alkylene group.

In the case where the monomer (A-1) is a dialkyl (meth)acrylamide, an antifogging film obtained from the antifogging agent composition has particularly excellent adhesiveness to a substrate.

The content of the monomer (A-1) is favorably within the range from 35 to 90 parts by weight per a total content of 100 parts by weight of the monomer (A-1), the monomer (A-2), and the monomer (A-3). When the content of the monomer (A-1) is less than 35 parts by weight, sustainability of antifogging performance in the antifogging film is reduced. On the other hand, when the content of the monomer (A-1) exceeds 90 parts by weight, a stain of a water drip becomes conspicuous in the antifogging film.

In the case where the monomer (A-2) is a $C_1$ to $C_{16}$ (meth)acrylate, an antifogging film obtained from the antifogging agent composition has particularly excellent antifogging performance after heat resistance and moisture resistance tests. In the case where the carbon number is larger than 16, antifogging performance of the antifogging film obtained from the antifogging agent composition after heat resistance and moisture resistance tests is reduced.

The content of the monomer (A-2) is favorably within the range from 5 to 60 parts by weight per a total content of 100 parts by weight of the monomer (A-1), the monomer (A-2), and the monomer (A-3). When the content of the monomer (A-2) is less than 5 parts by weight, a stain of a water drip becomes conspicuous in the antifogging film. On the other hand, when the content of the monomer (A-2) exceeds 60 parts by weight, sustainability of antifogging performance in the antifogging film is reduced.

In the case where the monomer (A-3) is a hydroxyalkyl (meth)acrylate or hydroxyalkyl (meth)acrylamide, an antifogging film obtained from the antifogging agent composition has particularly excellent sustainability of antifogging performance.

The content of the monomer (A-3) is favorably within the range from 5 to 30 parts by weight per a total content of 100 parts by weight of the monomer (A-1), the monomer (A-2), and the monomer (A-3). When the content of the monomer (A-3) is less than 5 parts by weight, water resistance of the antifogging film is reduced and a stain of a water drip becomes conspicuous in the antifogging film. On the other hand, when the content of the monomer (A-3) exceeds 30 parts by weight, adhesiveness of the antifogging film to a substrate is reduced.

(Polyfunctional Blocked Isocyanate Compound (B))

In the case where the polyfunctional blocked isocyanate compound (B) is a diethyl malonate blocked isocyanate, the antifogging agent composition is favorably cured at low temperature (approximately 120° C.) with no catalyst.

When the isocyanate group content of the polyfunctional blocked isocyanate compound (B) is represented by "NCO" and the hydroxyl group content of the copolymer (A) is represented by "OH," an NCO/OH ratio obtained by dividing the isocyanate group content NCO by the hydroxyl group content OH of the copolymer (A) is favorably within the range from 0.1 to 1.5.

When the NCO/OH ratio is less than 0.1, water resistance of the antifogging film is reduced and a stain of a water drip becomes conspicuous in the antifogging film. On the other hand, when the NCO/OH ratio exceeds 1.5, sustainability of antifogging performance in the antifogging film is reduced.

[Antifogging Article]

An antifogging article according to this embodiment can be produced by applying an antifogging agent composition to a surface of an article that is a substrate to which antifogging performance is given, and heating and curing the antifogging agent composition on the surface of the article. The article to which this embodiment can be applied is not particularly limited.

However, because excellent sustainability of antifogging performance can be achieved in the antifogging article according to this embodiment, this embodiment can be favorably applied to an article used in an environment where condensation is easy to occur. Examples of such an article include a headlight of an automobile.

EXAMPLE

1. Preparation of Antifogging Agent Composition (1-1) Synthesis of Copolymer (A)

A reaction container including a thermometer, a stirring device, a nitrogen introduction tube, and a cooling tube was used to heat 213 parts by weight of t-amyl alcohol that was an organic solvent to 80° C. while a nitrogen gas was exhaled. The following solution (a) and solution (b) were dropped into this reaction container for two hours.

Solution (a): solution obtained by mixing 50 parts by weight of N,N-dimethyl acrylamide (monomer (A-1)), 35 parts by weight of butyl acrylate (monomer (A-2)), and 15 parts by weight of 2-hydroxy acrylate (monomer (A-3))

Solution (b): solution obtained by dissolving t-hexyl peroxypivalate (radical polymerization initiator) [trade name: Perhexyl PV (effective component 70% by weight) manufactured by NOF CORPORATION] having the content corresponding to 0.5 parts by weight in 20 parts by weight of t-amyl alcohol.

The solution of the copolymer (A) was obtained by stirring for one hour the solution in the reaction container into which the solution (a) and the solution (b) had been dropped. The polymerization conversion rate of the charged monomer of the copolymer (A) measured by gas chromatography was 100%. Further, the weight average molecular weight of the copolymer (A) measured by gel permeation chromatography was 93,000.

Further, the hydroxyl value of the copolymer (A) was calculated as the following formula.

$$[\text{Hydroxyl value}](\text{mg}KOH/\text{g}) = [\text{parts by weight of the monomer }(A\text{-}3)\text{ in}$$
$$100.0 \text{ parts by weight of the copolymer}(A)](\text{g})/$$
$$[\text{molor weight of the monomer }(A\text{-}3)](\text{g/mol}) \times KOH(\text{mg})$$
$$= 0.15(\text{g})/116.12(\text{g/mol}) \times 56100(\text{mg}KOH)$$
$$= 72.5(\text{mg}KOH/\text{g})$$

(1-2) Preparation of Antifogging Agent Composition (in the Case where a Malonate Blocked Isocyanate is used)

Hundred parts by weight of propylene glycol monomethylether, 200 parts by weight of diacetone alcohol, 100 parts by weight of methyl isobutyl ketone, and 267 parts by weight of n-butanol were added to 333 parts by weight of a polymerization solution containing 30.0% of the solid copolymer (A) corresponding to 100 parts by weight to adjust the solid content to 10.0% by weight.

As the polyfunctional blocked isocyanate compound (B), 83.5 parts by weight of a malonate blocked isocyanate of a hexamethylene diisocyanate [trade name: Duranate MF-K60B (NCO concentration of 6.5% by weight) manufactured by Asahi Kasei Chemicals Corporation] in which the NCO/OH ratio corresponded to 1.0 was used.

As the anionic surfactant (C-1), sodium di (2-ethylhexyl) sulfosuccinate [trade name: Rapisol A-80 (effective component 80.0% by weight) manufactured by NOF CORPORATION] having the content corresponding to 5.0 parts by weight was used.

As the cationic surfactant (C-2), didecyl dimethyl ammonium chloride [trade name: Nissan cation 2DB500E (effective component 50.0% by weight) manufactured by NOF CORPORATION] having the content corresponding to 0.01 parts by weight was used.

As the leveling agent, 0.01 parts by weight of polyether-modified polydimethylsiloxane [trade name: BYK333 manufactured by BYK Japan KK] was used.

By mixing the above-mentioned copolymer (A), polyfunctional blocked isocyanate compound (B), anionic surfactant (C-1), cationic surfactant (C-2), and leveling agent, an antifogging agent composition was obtained.

(1-3) Preparation of Antifogging Agent Composition (in the Case where those other than a Malonate Blocked Isocyanate are Used)

Hundred parts by weight of propylene glycol monomethylether, 200 parts by weight of diacetone alcohol, 100 parts by weight of methyl isobutyl ketone, and 267 parts by weight of n-butanol were added to 333 parts by weight of a polymerization solution containing 30.0% of the solid copolymer (A) corresponding to 100 parts by weight to adjust the solid content to 10.0% by weight.

As the polyfunctional blocked isocyanate compound (B), 51.7 parts by weight of a dimethylpyrazole blocked isocyanate of a hexamethylene diisocyanate [trade name: Desmodur 3575/1 (NCO concentration of 10.5% by weight) manufactured by Sumika Bayer Urethane Co., Ltd.] in which the NCO/OH ratio corresponded to 1.0 was used.

As the anionic surfactant (C-1), sodium di (2-ethylhexyl) sulfosuccinate [trade name: Rapisol A-80 (effective component 80.0% by weight) manufactured by NOF CORPORATION] having the content corresponding to 5.0 parts by weight was used.

As the cationic surfactant (C-2), 1-methyl-1-hydroxyethyl-2-tallow alkyl imidazolinium chloride [trade name:

Nissan cation AR-4 (effective component 35.0% by weight) manufactured by NOF CORPORATION] having the content corresponding to 3.0 parts by weight was used.

As the catalyst, 1.0 parts by weight of dibutyl tin dilaurate was used.

As the leveling agent, 0.01 parts by weight of polyether-modified polydimethylsiloxane [trade name: BYK333 manufactured by BYK Japan KK] was used.

By mixing the above-mentioned copolymer (A), polyfunctional blocked isocyanate compound (B), anionic surfactant (C-1), cationic surfactant (C-2), catalyst, and leveling agent, an antifogging agent composition was obtained.

2. Preparation of Antifogging Film

As a substrate on which an antifogging film was formed, a polycarbonate resin plate was used. An antifogging agent composition was applied to the polycarbonate resin plate with a spray coating method so that the film thickness of the cured antifogging film was 5 μm. Then, the antifogging agent composition was heated and cured by holding the polycarbonate resin plate to which the antifogging agent composition was applied at 130° C. for 30 minutes. Accordingly, an antifogging film specimen having an antifogging film was obtained.

3. Performance Evaluation for Antifogging Film (3-1) Antifogging Performance (a) Sustainability Test After the antifogging film of the antifogging film specimen was applied with steam by a water bath by placing the antifogging film specimen at a 2-cm-high position from the surface of the water bath maintained at 80° C. so that the antifogging film looked down for the surface of the water bath, the antifogging film specimen was dried for one hour at room temperature while the antifogging film specimen was vertically erected. This is repeated 50 times before existence or non-existence of fogging in 10 seconds of the steam application was visually evaluated using the following four grades.

A: A water film is formed right after the steam application and no fogging occurs.

B: Although fogging is recognized for a moment right after the steam application, a water film is soon formed and the fogging is eliminated.

C: Although fogging is recognized right after the steam application, a water film is formed before long and the fogging is eliminated.

D: A clear water film is not formed after the steam application, or a water film is not formed and fogging is recognized.

Note that in the evaluation of the antifogging film formed in the antifogging film specimen, "C" or upper grades have no practical problem, "B" is favorable, and "A" is more favorable.

(b) Steam Test

The antifogging film of the antifogging film specimen was applied with steam by a water bath by placing the antifogging film specimen at a 2-cm-high position from the surface of the water bath maintained at 80° C. so that the antifogging film looked down for the surface of the water bath, and existence or non-existence of fogging in 10 seconds of the steam application was visually evaluated using the following four grades.

A: A water film is formed right after the steam application and no fogging occurs.

B: Although fogging is recognized for a moment right after the steam application, a water film is soon formed and the fogging is eliminated.

C: Although fogging is recognized right after the steam application, a water film is formed before long and the fogging is eliminated.

D: Fogging is recognized right after the steam application and a water film is not formed.

Note that in the evaluation of the antifogging film formed in the antifogging film specimen, "C" or upper grades have no practical problem, "B" is favorable, and "A" is more favorable.

(c) Steam Test after Moisture Resistance Test

The antifogging film specimen was placed under the conditions of 50° C. and 95% RH for 240 hours, and then at room temperature for one hour. After that, the antifogging film of the antifogging film specimen was applied with steam by a water bath by placing the antifogging film specimen at a 2-cm-high position from the surface of the water bath maintained at 80° C. so that the antifogging film looked down for the surface of the water bath, and existence or non-existence of fogging in 10 seconds of the steam application was visually evaluated using the following four grades.

A: A water film is formed right after the steam application and no fogging occurs.

B: Although fogging is recognized for a moment right after the steam application, a water film is soon formed and the fogging is eliminated.

C: Although fogging is recognized right after the steam application, a water film is formed before long and the fogging is eliminated.

D: A clear water film is not formed after the steam application, or a water film is not formed and fogging is recognized.

Note that in the evaluation of the antifogging film formed in the antifogging film specimen, "C" or upper grades have no practical problem, "B" is favorable, and "A" is more favorable.

(d) Steam Test after Heat Resistance Test

The antifogging film specimen was placed under the conditions of 120° C. for 240 hours, and then at room temperature for one hour. After that, the antifogging film of the antifogging film specimen was applied with steam by a water bath by placing the antifogging film specimen at a 2-cm-high position from the surface of the water bath maintained at 80° C. so that the antifogging film looked down for the surface of the water bath, and existence or non-existence of fogging in 10 seconds of the steam application was visually evaluated using the following four grades.

A: A water film is formed right after the steam application and no fogging occurs.

B: Although fogging is recognized for a moment right after the steam application, a water film is soon formed and the fogging is eliminated.

C: Although fogging is recognized right after the steam application, a water film is formed before long and the fogging is eliminated.

D: A clear water film is not formed after the steam application, or a water film is not formed and fogging is recognized.

Note that in the evaluation of the antifogging film formed in the antifogging film specimen, "C" or upper grades have no practical problem, "B" is favorable, and "A" is more favorable.

(3-2) Stain of Water Drip

After the antifogging film of the antifogging film specimen was applied with steam by a water bath by placing the antifogging film specimen at a 2-cm-high position from the surface of the water bath maintained at 80° C. so that the antifogging film looked down for the surface of the water bath, the antifogging film specimen was dried for one hour at room temperature while the antifogging film specimen was vertically erected. Existence or non-existence of a stain of a water drip on the dried antifogging film specimen was visually evaluated using the following four grades.

A: A stain of a water drip is not conspicuous.
B: A stain of a water drip is not substantially conspicuous.
C: A stain of a water drip is a bit conspicuous.
D: A stain of a water drip is conspicuous.

Note that in the evaluation of the antifogging film formed in the antifogging film specimen, "C" or upper grades have no practical problem, "B" is favorable, and "A" is more favorable.

(3-3) Adhesiveness

According to JIS K 5600-5-6, existence or non-existence of peeling of the antifogging film in the antifogging film specimen was visually evaluated using the following three grades.

A: No peeling is recognized
B: Peeling is partly recognized
D: It is completely peeled Note that in the evaluation of the antifogging film formed in the antifogging film specimen, "B" or upper grades have no practical problem and "A" is more favorable.

(3-4) Water Resistance

The antifogging film specimen was placed in hot water of 40° C. for 240 hours and then at room temperature for one hour. After that, the appearance of the antifogging film of the antifogging film specimen was visually evaluated using the following four grades.

A: No change occurs in the appearance as compared with before the test.
B: The surface of the coating film is slightly rough.
C: The surface of the coating film is slightly rough or a slight whitening or stain is recognized.
D: A part or whole of the coating film is resolved or an obvious whitening or stain is recognized.

Note that in the evaluation of the antifogging film formed in the antifogging film specimen, "C" or upper grades have no practical problem, "B" is favorable, and "A" is more favorable.

4. Evaluation Results of Antifogging Film (4-1) Examples 1-1 to 1-9

In examples 1-1 to 1-9, the kind and content of each of the anionic surfactant (C-1) and the cationic surfactant (C-2) were mainly examined. Antifogging film specimens according to the examples 1-1 to 1-9 were prepared with the same method as that described above. Table 1 shows the composition (parts by weight) of antifogging agent compositions according to the examples 1-1 to 1-9 and evaluation results of performance of antifogging film specimens in which an antifogging film is formed by the antifogging agent composition.

TABLE 1

| | | | | Example | | | | |
|---|---|---|---|---|---|---|---|---|
| | | | | 1-1 | 1-2 | 1-3 | 1-4 | 1-5 |
| Antifogging agent composition | Copolymer (A) [parts by weight] | Monomer (A-1) | DMAA | 50 | 50 | 50 | 50 | 50 |
| | | Monomer (A-2) | BA (C4) | 35 | 35 | 35 | 35 | 35 |
| | | Monomer (A-3) | HEA | 15 | 15 | 15 | 15 | 15 |
| | | Total monomer | | 100 | 100 | 100 | 100 | 100 |
| | | Hydroxyl value [mgKOH/g] | | 72.5 | 72.5 | 72.5 | 72.5 | 72.5 |
| | Polyfunctional blocked isocyanate compound (B) [parts by weight] | Diethyl malonate blocked isocyanate | Duranate MF-K60B | 83.5 | 83.5 | | 83.5 | |
| | | Dimethylpyrazole blocked isocyanate | Desmodur BL3575/1 | | | 51.7 | | 51.7 |
| | | NCO/OH ratio | | 1.0 | 1.0 | 1.0 | 1.0 | 1.0 |
| | Surfactant (C) [parts by weight] | Anion-based (C-1) | Rapisol A80 | 5.0 | | | 5.0 | 1.0 |
| | | | Persoft SK | | 5.0 | | | 1.0 |
| | | Cation-based (C-2) | Nissan cation 2DB500E | 0.01 | | | | |
| | | | Nissan cation BB | | 0.50 | | 0.01 | 0.50 |
| | | | Nissan cation AR-4 | | | 3.00 | | |
| | | | Ftergent 300 | | | | | |
| | Catalyst [parts by weight] | Dibutyl tin dilaurate | | | | | 1.0 | 1.0 |
| Performance | | Antifogging performance | Sustainability test | C | B | B | C | C |
| | | | Steam test | A | A | A | B | A |
| | | | Steam test after moisture resistance test | B | A | A | B | A |
| | | | Steam test after heat resistance test | B | A | A | C | B |
| | | Stain of water drip | | A | A | B | A | A |
| | | Adhesiveness | | A | A | A | A | A |
| | | Water resistance | | A | A | A | A | A |

| | | | | Example | | | |
|---|---|---|---|---|---|---|---|
| | | | | 1-6 | 1-7 | 1-8 | 1-9 |
| Antifogging agent composition | Copolymer (A) [parts by weight] | Monomer (A-1) | DMAA | 50 | 50 | 50 | 50 |
| | | Monomer (A-2) | BA (C4) | 35 | 35 | 35 | 35 |
| | | Monomer (A-3) | HEA | 15 | 15 | 15 | 15 |
| | | Total monomer | | 100 | 100 | 100 | 100 |
| | | Hydroxyl value [mgKOH/g] | | 72.5 | 72.5 | 72.5 | 72.5 |

TABLE 1-continued

| | | | | | | | |
|---|---|---|---|---|---|---|---|
| | Polyfunctional blocked isocyanate compound (B) [parts by weight] | Diethyl malonate blocked isocyanate | Duranate MF-K60B | 83.5 | | 83.5 | 83.5 |
| | | Dimethylpyrazole blocked isocyanate | Desmodur BL3575/1 | | 51.7 | | |
| | | NCO/OH ratio | | 1.0 | 1.0 | 1.0 | 1.0 |
| | Surfactant (C) [parts by weight] | Anion-based (C-1) | Rapisol A80 | 1.0 | | 10.0 | 10.0 |
| | | | Persoft SK | | 10.0 | | |
| | | Cation-based (C-2) | Nissan cation 2DB500E | | | | |
| | | | Nissan cation BB | | 0.01 | | |
| | | | Nissan cation AR-4 | | | | |
| | | | Ftergent 300 | 3.00 | | 0.50 | 3.00 |
| | Catalyst [parts by weight] | Dibutyl tin dilaurate | | | 1.0 | | |
| Performance | | Antifogging performance | Sustainability test | B | B | B | B |
| | | | Steam test | A | A | A | A |
| | | | Steam test after moisture resistance test | A | A | A | A |
| | | | Steam test after heat resistance test | B | A | A | A |
| | | Stain of water drip | | B | B | B | C |
| | | Adhesiveness | | A | A | A | A |
| | | Water resistance | | A | A | A | A |

Note that the abbreviated notation of each material in Table 1 will be described later.

As shown in Table 1, in each of the examples 1-1 to 1-9, favorable performance of the antifogging film was confirmed. Particularly favorably performance was achieved in the antifogging film according to the example 1-2.

From the results of the examples 1-1, 1-4, and 1-5, it was seen that sustainability of antifogging performance of the antifogging film tended to be slightly reduced in the case where the amount of at least one of the anionic surfactant (C-1) and the cationic surfactant (C-2) was small.

From the result of the example 1-4, it was seen that antifogging performance of the antifogging film tended to be slightly reduced in the case where the amounts of the anionic surfactant (C-1) and the cationic surfactant (C-2) were small.

From the results of the examples 1-1 and 1-4, it was seen that antifogging performance of the antifogging film after the moisture resistance test tended to be slightly reduced in the case where the amount of the cationic surfactant (C-2) was small.

From the results of the examples 1-1, 1-4, 1-5, and 1-6, it was seen that antifogging performance of the antifogging film after the heat resistance test tended to be slightly reduced in the case where the amount of at least one of the anionic surfactant (C-1) and the cationic surfactant (C-2) was small.

From the results of the examples 1-3, 1-6, 1-7, 1-8, and 1-9, it was seen that a stain of a water drip on the antifogging film tended to be conspicuous in the case where the amount of at least one of the anionic surfactant (C-1) and the cationic surfactant (C-2) was large.

(4-2) Examples 1-10 to 1-21

In examples 1-10 to 1-21, the kind of each of the monomer (A-1), the monomer (A-2), and the monomer (A-3) was mainly examined. Antifogging film specimens according to the examples 1-10 to 1-21 were prepared with the same method as that described above. Table 2 shows the composition (parts by weight) of antifogging agent compositions according to the examples 1-10 to 1-21 and evaluation results of performance of antifogging film specimens in which an antifogging film is formed by the antifogging agent composition.

TABLE 2

| | | | | Example | | | | | |
|---|---|---|---|---|---|---|---|---|---|
| | | | | 1-10 | 1-11 | 1-12 | 1-13 | 1-14 | 1-15 |
| Antifogging agent composition | Copolymer (A) [parts by weight] | Monomer (A-1) | DMAA | | | | | | 50 |
| | | | DEMA | 50 | | | | | |
| | | | IPAA | | 50 | | | | |
| | | | DAAA | | | 50 | | | |
| | | | DMAPAA | | | | 50 | | |
| | | | ACMO | | | | | 50 | |
| | | Monomer (A-2) | MMA (C1) | | | | | | 35 |
| | | | BA (C4) | 35 | 35 | 35 | 35 | 35 | |
| | | | CHA (C6) | | | | | | |
| | | | CA (C16) | | | | | | |
| | | Monomer (A-3) | HEA | 15 | 15 | 15 | 15 | 15 | 15 |
| | | | HEMA | | | | | | |
| | | | HEAA | | | | | | |
| | | | Placcel FA2D | | | | | | |
| | | | Placcel FA5 | | | | | | |
| | | Total monomer | | 100 | 100 | 100 | 100 | 100 | 100 |
| | | Hydroxyl value [mgKOH/g] | | 72.5 | 72.5 | 72.5 | 72.5 | 72.5 | 72.5 |

TABLE 2-continued

|  |  |  |  |  |  |  |  |  |  |
|---|---|---|---|---|---|---|---|---|---|
|  | Polyfunctional blocked isocyanate compound (B) [parts by weight] | Diethyl malonate blocked isocyanate | Duranate MF-K60B |  | 83.5 |  |  | 83.5 | 83.5 |
|  |  | Dimethylpyrazole blocked isocyanate | Desmodur BL3575/1 |  |  | 51.7 | 51.7 |  |  |
|  |  | Methyl ethyl ketoxime blocked isocyanate | Sumidur BL 3175 | 48.9 |  |  |  |  |  |
|  |  | NCO/OH ratio |  | 1.0 | 1.0 | 1.0 | 1.0 | 1.0 | 1.0 |
|  | Surfactant (C) [parts by weight] | Anion-based (C-1) | Rapisol A80 |  |  | 5.0 |  |  | 5.0 |
|  |  |  | Persoft SK | 5.0 | 5.0 |  | 5.0 | 5.0 |  |
|  |  | Cation-based (C-2) | Nissan cation 2DB500E |  | 0.50 |  |  | 0.50 |  |
|  |  |  | Nissan cation BB | 0.50 |  | 0.50 |  |  |  |
|  |  |  | Nissan cation AR-4 |  |  |  | 0.50 |  |  |
|  |  |  | Ftergent 300 |  |  |  |  |  | 0.50 |
|  | Catalyst [parts by weight] | Dibutyl tin dilaurate |  | 1.0 |  | 1.0 | 1.0 |  |  |
| Performance | Antifogging performance | Sustainability test |  | B | B | B | B | B | B |
|  |  | Steam test |  | A | A | A | A | A | A |
|  |  | Steam test after moisture resistance test |  | A | A | A | A | A | A |
|  |  | Steam test after heat resistance test |  | A | A | A | A | A | A |
|  | Stain of water drip |  |  | A | A | A | A | A | B |
|  | Adhesiveness |  |  | A | B | B | B | B | A |
|  | Water resistance |  |  | A | A | A | A | A | A |

|  |  |  |  | Example |  |  |  |  |  |
|---|---|---|---|---|---|---|---|---|---|
|  |  |  |  | 1-16 | 1-17 | 1-18 | 1-19 | 1-20 | 1-21 |
| Antifogging agent composition | Copolymer (A) [parts by weight] | Monomer (A-1) | DMAA | 50 | 50 | 50 | 50 | 45 | 45 |
|  |  |  | DEMA |  |  |  |  |  |  |
|  |  |  | IPAA |  |  |  |  |  |  |
|  |  |  | DAAA |  |  |  |  |  |  |
|  |  |  | DMAPAA |  |  |  |  |  |  |
|  |  |  | ACMO |  |  |  |  |  |  |
|  |  | Monomer (A-2) | MMA (C1) |  |  |  |  |  |  |
|  |  |  | BA (C4) |  |  | 33 | 35 | 30 | 25 |
|  |  |  | CHA (C6) | 35 |  |  |  |  |  |
|  |  |  | CA (C16) |  | 35 |  |  |  |  |
|  |  | Monomer (A-3) | HEA | 15 | 15 |  |  |  |  |
|  |  |  | HEMA |  |  | 17 |  |  |  |
|  |  |  | HEAA |  |  |  | 15 |  |  |
|  |  |  | Placcel FA2D |  |  |  |  | 25 |  |
|  |  |  | Placcel FA5 |  |  |  |  |  | 30 |
|  |  | Total monomer |  | 100 | 100 | 100 | 100 | 100 | 100 |
|  |  | Hydroxyl value [mgKOH/g] |  | 72.5 | 72.5 | 73.3 | 73.1 | 40.8 | 24.4 |
|  | Polyfunctional blocked isocyanate compound (B) [parts by weight] | Diethyl malonate blocked isocyanate | Duranate MF-K60B |  |  | 84.2 |  | 47.0 | 28.1 |
|  |  | Dimethylpyrazole blocked isocyanate | Desmodur BL3575/1 | 51.7 | 51.7 |  |  |  |  |
|  |  | Methyl ethyl ketoxime blocked isocyanate | Sumidur BL 3175 |  |  |  | 49.3 |  |  |
|  |  | NCO/OH ratio |  | 1.0 | 1.0 | 1.0 | 1.0 | 1.0 | 1.0 |
|  | Surfactant (C) [parts by weight] | Anion-based (C-1) | Rapisol A80 |  |  |  |  |  | 5.0 |
|  |  |  | Persoft SK | 5.0 | 5.0 | 5.0 | 5.0 | 5.0 |  |
|  |  | Cation-based (C-2) | Nissan cation 2DB500E | 0.50 |  |  |  | 0.50 |  |
|  |  |  | Nissan cation BB |  | 0.50 | 0.50 |  |  | 0.50 |
|  |  |  | Nissan cation AR-4 |  |  |  |  |  |  |
|  |  |  | Ftergent 300 |  |  |  | 0.50 |  |  |
|  | Catalyst [parts by weight] | Dibutyl tin dilaurate |  | 1.0 | 1.0 |  | 1.0 |  |  |
| Performance | Antifogging performance | Sustamability test |  | B | B | B | B | C | C |
|  |  | Steam test |  | A | A | A | A | A | A |
|  |  | Steam test after moisture resistance test |  | A | B | A | A | A | A |
|  |  | Steam test after heat resistance test |  | A | B | A | A | A | A |
|  | Stain of water drip |  |  | A | A | A | A | A | A |
|  | Adhesiveness |  |  | A | A | A | A | A | B |
|  | Water resistance |  |  | A | A | A | A | A | A |

Note that the abbreviated notation of each material in Table 2 will be described later.

As shown in Table 2, in each of the examples 1-10 to 1-21, favorable performance of the antifogging film was confirmed.

From the results of the examples 1-10, 1-16, 1-18, and 1-19, it was seen that particularly favorable performance was achieved in the case where the monomer (A-1) was a dialkyl acrylamide, where the monomer (A-2) was a $C_6$ acrylic acid ester, or where the monomer (A-3) was a hydroxy ethyl methacrylate or hydroxy ethyl acrylamide.

From the results of the examples 1-20 and 1-21, it was seen that sustainability of antifogging performance of the antifogging film tended to be slightly reduced in the case where the monomer (A-3) was a long-chain hydroxy acrylate or further longer-chain hydroxy acrylate.

From the result of the example 1-17, it was seen that antifogging performance of the antifogging film after moisture resistance and heat resistance tests tended to be slightly reduced in the case where the monomer (A-2) was a $C_{16}$ acrylic acid ester.

From the result of the example 1-15, it was seen that a stain of a water drip of the antifogging film tended to be conspicuous in the case where the monomer (A-2) was a $C_1$ acrylic acid ester.

From the results of the examples 1-11, 1-12, 1-13, 1-14, and 1-21, it was seen that the adhesiveness of the antifogging film in the antifogging film specimen tended to be slightly reduced in the case where the monomer (A-1) was a monoalkyl acrylamide, diacetone acrylamide, dimethylaminopropyl acrylamide, or acryloyl morpholine or where the monomer (A-3) was a long-chain hydroxy acrylate.

(4-3) Examples 1-22 to 1-26

In examples 1-22 to 1-26, the amount of each of the monomer (A-1), the monomer (A-2), the monomer (A-3), and the polyfunctional blocked isocyanate compound (B) was mainly examined. Antifogging film specimens according to the examples 1-22 to 1-26 were prepared with the same method as that described above. Table 3 shows the composition (parts by weight) of antifogging agent compositions according to the examples 1-22 to 1-26 and evaluation results of performance of antifogging film specimens in which an antifogging film is formed by the antifogging agent composition.

From the results of the examples 1-23 and 1-26, it was seen that sustainability of antifogging performance of the antifogging film tended to be slightly reduced in the case where the amount of the monomer (A-2) was large and the amounts of the monomer (A-1) and the monomer (A-3) were small, or where the amount of the polyfunctional blocked isocyanate compound (B) was large.

From the results of the examples 1-22, 1-23, and 1-25, it was seen that a stain of a water drip on the antifogging film tended to be conspicuous in the case where the amount of the monomer (A-1) was large and the amounts of the monomer (A-2) and the monomer (A-3) were small, where the amount of the monomer (A-2) was large and the amounts of the monomer (A-1) and the monomer (A-3) were small, or where the amount of the polyfunctional blocked isocyanate compound (B) was small.

From the result of the example 1-24, it was seen that the adhesiveness of the antifogging film in the antifogging film specimen tended to be slightly reduced in the case where the amount of the monomer (A-3) was large.

From the results of the examples 1-22, 1-23, and 1-25, it was seen that water resistance of the antifogging film tended to be slightly reduced in the case where the amount of the monomer (A-1) was large and the amounts of the monomer (A-2) and the monomer (A-3) were small, where the amount of the monomer (A-2) was large and the amounts of the monomer (A-1) and the monomer (A-3) were small, or where the amount of the polyfunctional blocked isocyanate compound (B) was small.

(4-4) Examples 2-1 to 2-9

In examples 2-1 to 2-9, the kind and amount of each of the anionic surfactant (C-1) and the cationic surfactant (C-2) in the case where a fluorochemical surfactant was used as the

TABLE 3

| | | | | Example | | | | |
|---|---|---|---|---|---|---|---|---|
| | | | | 1-22 | 1-23 | 1-24 | 1-25 | 1-26 |
| Antifogging agent composition | Copolymer (A) [parts by weight] | Monomer (A-1) | DMAA | 90 | 35 | 50 | 50 | 50 |
| | | Monomer (A-2) | BA (C4) | 5 | 60 | 20 | 35 | 35 |
| | | Monomer (A-3) | HEA | 5 | 5 | 30 | 15 | 15 |
| | | Total monomer | | 100 | 100 | 100 | 100 | 100 |
| | | Hydroxyl value [mgKOH/g] | | 24.2 | 24.2 | 144.9 | 72.5 | 72.5 |
| | Polyfunctional blocked isocyanate compound (B) [parts by weight] | Diethyl malonate blocked isocyanate | Duranate MF-K60B | 27.8 | | 83.5 | 8.4 | 125.3 |
| | | Dimethylpyrazole blocked isocyanate | Desmodur BL3575/1 | | 17.3 | | | |
| | | NCO/OH ratio | | 1.0 | 1.0 | 0.5 | 0.1 | 1.5 |
| | Surfactant (C) [parts by weight] | Anion-based (C-1) | Rapisol A80 | | 5.0 | | | |
| | | | Persoft SK | 5.0 | | 5.0 | 5.0 | 5.0 |
| | | Cation-based (C-2) | Nissan cation 2DB500E | 0.5 | | | | |
| | | | Nissan cation BB | | | | 0.50 | 0.50 |
| | | | Nissan cation AR-4 | | | 0.5 | | |
| | | | Ftergent 300 | | | | | |
| | Catalyst [parts by weight] | Dibutyl tin dilaurate | | | | 1.0 | | |
| Performance | | Antifogging performance | Sustainability test | B | C | B | B | C |
| | | | Steam test | A | A | A | A | A |
| | | | Steam test after moisture resistance test | A | A | A | A | A |
| | | | Steam test after heat resistance test | A | A | A | A | A |
| | | Stain of water drip | | C | B | A | C | A |
| | | Adhesiveness | | A | A | B | A | A |
| | | Water resistance | | C | B | A | C | A |

Note that the abbreviated notation of each material in Table 3 will be described later.

As shown in Table 3, in each of the examples 1-22 to 1-26, favorable performance of the antifogging film was confirmed.

anionic surfactant (C-1) were mainly examined. Antifogging film specimens according to the examples 2-1 to 2-9 were prepared with the same method as that described above. Table 4 shows the composition (parts by weight) of antifogging agent compositions according to the examples 2-1 to 2-9 and evaluation results of performance of antifogging film specimens in which an antifogging film is formed by the antifogging agent composition.

From the results of the examples 2-1, 2-4, and 2-5, it was seen that sustainability of antifogging performance of the

TABLE 4

|  |  |  |  | Example 2-1 | Example 2-2 | Example 2-3 | Example 2-4 | Example 2-5 |
|---|---|---|---|---|---|---|---|---|
| Antifogging agent composition | Copolymer (A) [parts by weight] | Monomer (A-1) | DMAA | 50 | 50 | 50 | 50 | 50 |
|  |  | Monomer (A-2) | BA (C4) | 35 | 35 | 35 | 35 | 35 |
|  |  | Monomer (A-3) | HEA | 15 | 15 | 15 | 15 | 15 |
|  |  | Total monomer |  | 100 | 100 | 100 | 100 | 100 |
|  |  | Hydroxyl value [mgKOH/g] |  | 72.5 | 72.5 | 72.5 | 72.5 | 72.5 |
|  | Polyfunctional blocked isocyanate compound (B) [parts by weight] | Diethyl malonate blocked isocyanate | Duranate MF-K60B | 83.5 | 83.5 |  | 83.5 |  |
|  |  | Dimethylpyrazole blocked isocyanate | Desmodur BL3575/1 |  |  | 51.7 |  | 51.7 |
|  |  | NCO/OH ratio |  | 1.0 | 1.0 | 1.0 | 1.0 | 1.0 |
|  | Surfactant (C) [parts by weight] | Anion-based (C-1) | Fluorine-based Ftergent 100 | 5.0 |  |  | 5.0 | 1.0 |
|  |  |  | Surflon S211 |  | 5.0 |  |  | 1.0 |
|  |  | Cation-based (C-2) | Nissan cation 2DB500E | 0.01 |  |  |  |  |
|  |  |  | Nissan cation BB |  | 0.50 |  | 0.01 | 0.50 |
|  |  |  | Nissan cation AR-4 |  |  | 3.00 |  |  |
|  |  |  | Ftergent 300 |  |  |  |  |  |
|  | Catalyst [parts by weight] | Dibutyl tin dilaurate |  |  |  | 1.0 |  | 1.0 |
| Performance |  | Antifogging performance | Sustainability test | B | A | A | B | B |
|  |  |  | Steam test | A | A | A | B | A |
|  |  |  | Steam test after moisture resistance test | B | A | A | B | A |
|  |  |  | Steam test after heat resistance test | B | A | A | C | B |
|  |  | Stain of water drip |  | A | A | B | A | A |
|  |  | Adhesiveness |  | A | A | A | A | A |
|  |  | Water resistance |  | A | A | A | A | A |

|  |  |  |  | Example 2-6 | Example 2-7 | Example 2-8 | Example 2-9 |
|---|---|---|---|---|---|---|---|
| Antifogging agent composition | Copolymer (A) [parts by weight] | Monomer (A-1) | DMAA | 50 | 50 | 50 | 50 |
|  |  | Monomer (A-2) | BA (C4) | 35 | 35 | 35 | 35 |
|  |  | Monomer (A-3) | HEA | 15 | 15 | 15 | 15 |
|  |  | Total monomer |  | 100 | 100 | 100 | 100 |
|  |  | Hydroxyl value [mgKOH/g] |  | 72.5 | 72.5 | 72.5 | 72.5 |
|  | Polyfunctional blocked isocyanate compound (B) [parts by weight] | Diethyl malonate blocked isocyanate | Duranate MF-K60B | 83.5 |  | 83.5 | 83.5 |
|  |  | Dimethylpyrazole blocked isocyanate | Desmodur BL3575/1 |  | 51.7 |  |  |
|  |  | NCO/OH ratio |  | 1.0 | 1.0 | 1.0 | 1.0 |
|  | Surfactant (C) [parts by weight] | Anion-based (C-1) | Fluorine-based Ftergent 100 | 1.0 |  | 10.0 | 10.0 |
|  |  |  | Surflon S211 |  | 10.0 |  |  |
|  |  | Cation-based (C-2) | Nissan cation 2DB500E |  |  |  |  |
|  |  |  | Nissan cation BB |  |  | 0.01 |  |
|  |  |  | Nissan cation AR-4 |  |  |  |  |
|  |  |  | Ftergent 300 | 3.00 |  | 0.50 | 3.00 |
|  | Catalyst [parts by weight] | Dibutyl tin dilaurate |  |  | 1.0 |  |  |
| Performance |  | Antifogging performance | Sustainability test | A | A | A | A |
|  |  |  | Steam test | A | A | A | A |
|  |  |  | Steam test after moisture resistance test | A | A | A | A |
|  |  |  | Steam test after heat resistance test | B | A | A | A |
|  |  | Stain of water drip |  | B | B | B | C |
|  |  | Adhesiveness |  | A | A | A | A |
|  |  | Water resistance |  | A | A | A | A |

Note that the abbreviated notation of each material in Table 4 will be described later.

As shown in Table 4, in each of the examples 2-1 to 2-9, favorable performance of the antifogging film was confirmed. Particularly favorably performance was achieved in the antifogging film according to the example 2-2.

antifogging film tended to be slightly reduced in the case where the amount of at least one of the anionic surfactant (C-1) and the cationic surfactant (C-2) was small.

From the result of the example 2-4, it was seen that antifogging performance of the antifogging film tended to be slightly reduced in the case where the amounts of the anionic surfactant (C-1) and the cationic surfactant (C-2) were small.

From the results of the examples 2-1 and 2-4, it was seen that antifogging performance of the antifogging film after the moisture resistance test tended to be slightly reduced in the case where the amount of the cationic surfactant (C-2) was small.

From the results of the examples 2-1, 2-4, 2-5, and 2-6, it was seen that antifogging performance of the antifogging film after the heat resistance test tended to be slightly reduced in the case where the amount of at least one of the anionic surfactant (C-1) and the cationic surfactant (C-2) was small.

From the results of the examples of 2-3, 2-6, 2-7, 2-8, and 2-9, it was seen that a stain of a water drip on the antifogging film tended to be conspicuous in the case where the amount of at least one of the anionic surfactant (C-1) and the cationic surfactant (C-2) was large.

(4-5) Examples 2-10 to 2-21

In examples 2-10 to 2-21, the kind of each of the monomer (A-1), the monomer (A-2), and the monomer (A-3) in the case where a fluorochemical surfactant was used as the anionic surfactant (C-1) was mainly examined. Antifogging film specimens according to the examples 2-10 to 2-21 were prepared with the same method as that described above. Table 5 shows the composition (parts by weight) of antifogging agent compositions according to the examples 2-10 to 2-21 and evaluation results of performance of antifogging film specimens in which an antifogging film is formed by the antifogging agent composition.

TABLE 5

| | | | | Example | | | | | |
|---|---|---|---|---|---|---|---|---|---|
| | | | | 2-10 | 2-11 | 2-12 | 2-13 | 2-14 | 2-15 |
| Antifogging agent composition | Copolymer (A) [parts by weight] | Monomer (A-1) | DMAA | | | | | | 50 |
| | | | DEMA | 50 | | | | | |
| | | | IPAA | | 50 | | | | |
| | | | DAAA | | | 50 | | | |
| | | | DMAPAA | | | | 50 | | |
| | | | ACMO | | | | | 50 | |
| | | Monomer (A-2) | MMA (C1) | | | | | | 35 |
| | | | BA (C4) | 35 | 35 | 35 | 35 | 35 | |
| | | | CHA (C6) | | | | | | |
| | | | CA (C16) | | | | | | |
| | | Monomer (A-3) | HEA | 15 | 15 | 15 | 15 | 15 | 15 |
| | | | HEMA | | | | | | |
| | | | HEAA | | | | | | |
| | | | Placcel FA2D | | | | | | |
| | | | Placcel FA5 | | | | | | |
| | | Total monomer | | 100 | 100 | 100 | 100 | 100 | 100 |
| | | Hydroxyl value [mgKOH/g] | | 72.5 | 72.5 | 72.5 | 72.5 | 72.5 | 72.5 |
| | Polyfunctional blocked isocyanate compound (B) [parts by weight] | Diethyl malonate blocked isocyanate | Duranate MF-K60B | | 83.5 | | | 83.5 | 83.5 |
| | | Dimethylpyrazole blocked isocyanate | Desmodur BL3575/1 | | | 51.7 | 51.7 | | |
| | | Methyl ethyl ketoxime blocked isocyanate | Sumidur BL 3175 | 48.9 | | | | | |
| | | NCO/OH ratio | | 1.0 | 1.0 | 1.0 | 1.0 | 1.0 | 1.0 |
| | Surfactant (C) [parts by weight] | Anion-based (C-1) | Fluorine-based Ftergent 100 | | | | 5.0 | | |
| | | | Surflon S211 | 5.0 | 5.0 | | | 5.0 | 5.0 |
| | | Cation-based (C-2) | Nissan cation 2DB500E | | 0.50 | | | 0.50 | |
| | | | Nissan cation BB | 0.50 | | 0.50 | | | |
| | | | Nissan cation AR-4 | | | | 0.50 | | |
| | | | Ftergent 300 | | | | | | 0.50 |
| | Catalyst [parts by weight] | Dibutyl tin dilaurate | | 1.0 | | 1.0 | 1.0 | | |
| Performance | | Antifogging performance | Sustainability test | A | A | A | A | A | A |
| | | | Steam test | A | A | A | A | A | A |
| | | | Steam test after moisture resistance test | A | A | A | A | A | A |
| | | | Steam test after heat resistance test | A | A | A | A | A | A |
| | | Stain of water drip | | A | A | A | A | A | B |
| | | Adhesiveness | | A | B | B | B | B | A |
| | | Water resistance | | A | A | A | A | A | A |

| | | | | Example | | | | | |
|---|---|---|---|---|---|---|---|---|---|
| | | | | 2-16 | 2-17 | 2-18 | 2-19 | 2-20 | 2-21 |
| Antifogging agent composition | Copolymer (A) [parts by weight] | Monomer (A-1) | DMAA | 50 | 50 | 50 | 50 | 45 | 45 |
| | | | DEMA | | | | | | |
| | | | IPAA | | | | | | |
| | | | DAAA | | | | | | |
| | | | DMAPAA | | | | | | |
| | | | ACMO | | | | | | |

TABLE 5-continued

| | | | | | | | | | |
|---|---|---|---|---|---|---|---|---|---|
| | Monomer (A-2) | MMA (C1) | | | | | | | |
| | | BA (C4) | | | 33 | 35 | 30 | 25 | |
| | | CHA (C6) | 35 | | | | | | |
| | | CA (C16) | | 35 | | | | | |
| | Monomer (A-3) | HEA | 15 | 15 | | | | | |
| | | HEMA | | | 17 | | | | |
| | | HEAA | | | | 15 | | | |
| | | Placcel FA2D | | | | | 25 | | |
| | | Placcel FA5 | | | | | | 30 | |
| | | Total monomer | 100 | 100 | 100 | 100 | 100 | 100 | |
| | | Hydroxyl value [mgKOH/g] | 72.5 | 72.5 | 73.3 | 73.1 | 40.8 | 24.4 | |
| | Polyfunctional blocked isocyanate compound (B) [parts by weight] | Diethyl malonate blocked isocyanate | Duranate MF-K60B | | | 84.2 | | 47.0 | 28.1 |
| | | Dimethylpyrazole blocked isocyanate | Desmodur BL3575/1 | 51.7 | 51.7 | | | | |
| | | Methyl ethyl ketoxime blocked isocyanate | Sumidur BL 3175 | | | | 49.3 | | |
| | | NCO/OH ratio | | 1.0 | 1.0 | 1.0 | 1.0 | 1.0 | 1.0 |
| | Surfactant (C) [parts by weight] | Anion-based (C-1) | Fluorine-based | Ftergent 100 | | | | | | 5.0 |
| | | | | Surflon S211 | 5.0 | 5.0 | 5.0 | 5.0 | 5.0 | |
| | | Cation-based (C-2) | Nissan cation 2DB500E | 0.50 | | | | 0.50 | |
| | | | Nissan cation BB | | 0.50 | 0.50 | | | 0.50 |
| | | | Nissan cation AR-4 | | | | | | |
| | | | Ftergent 300 | | | | 0.50 | | |
| | Catalyst [parts by weight] | Dibutyl tin dilaurate | | 1.0 | 1.0 | | 1.0 | | |
| Performance | | Antifogging performance | Sustainability test | A | A | A | A | B | B |
| | | | Steam test | A | A | A | A | A | A |
| | | | Steam test after moisture resistance test | A | B | A | A | A | A |
| | | | Steam test after heat resistance test | A | B | A | A | A | A |
| | | Stain of water drip | | A | A | A | A | A | A |
| | | Adhesiveness | | A | A | A | A | A | B |
| | | Water resistance | | A | A | A | A | A | A |

Note that the abbreviated notation of each material in Table 5 will be described later.

As shown in Table 5, in each of the examples 2-10 to 2-21, favorable performance of the antifogging film was confirmed.

From the results of the examples 2-10, 2-16, 2-18, and 2-19, particularly favorable performance of the antifogging film was achieved in the case where the monomer (A-1) was a dialkyl acrylamide, where the monomer (A-2) was a $C_6$ acrylic acid ester, or where the monomer (A-3) was a hydroxy ethyl methacrylate or hydroxy ethyl acrylamide.

From the results of the examples 2-20 and 2-21, it was seen that sustainability of antifogging performance of the antifogging film tended to be slightly reduced in the case where the monomer (A-3) was a long-chain hydroxy acrylate or further longer-chain hydroxy acrylate.

From the result of the example 2-17, it was seen that antifogging performance of the antifogging film after the moisture resistance and heat resistance tests tended to be slightly reduced in the case where the monomer (A-2) was a $C_{16}$ acrylic acid ester.

From the result of the example 2-15, it was seen that a stain of a water drip on the antifogging film tended to be conspicuous in the case where the monomer (A-2) was a $C_1$ acrylic acid ester.

From the results of the examples of 2-11, 2-12, 2-13, 2-14, and 2-21, it was seen that the adhesiveness of the antifogging film in the antifogging film specimen tended to be slightly reduced in the case where the monomer (A-1) was a monoalkyl acrylamide, diacetone acrylamide, dimethylaminopropyl acrylamide, or acryloyl morpholine, or where the monomer (A-3) was a further longer-chain hydroxy acrylate.

(4-6) Examples 2-22 to 2-26

In examples 2-22 to 2-26, the amount of each of the monomer (A-1), the monomer (A-2), the monomer (A-3), and the polyfunctional blocked isocyanate compound (B) in the case where a fluorochemical surfactant was used as the anionic surfactant (C-1) was mainly examined. Antifogging film specimens according to the examples 2-22 to 2-26 were prepared with the same method as that described above. Table 6 shows the composition (parts by weight) of antifogging agent compositions according to the examples 2-22 to 2-26 and evaluation results of performance of antifogging film specimens in which an antifogging film is formed by the antifogging agent composition.

TABLE 6

|  |  |  |  | Example |  |  |  |  |
|---|---|---|---|---|---|---|---|---|
|  |  |  |  | 2-22 | 2-23 | 2-24 | 2-25 | 2-26 |
| Antifogging agent composition | Copolymer (A) [parts by weight] | Monomer (A-1) | DMAA | 90 | 35 | 50 | 50 | 50 |
|  |  | Monomer (A-2) | BA (C4) | 5 | 60 | 20 | 35 | 35 |
|  |  | Monomer (A-3) | HEA | 5 | 5 | 30 | 15 | 15 |
|  |  | Total monomer |  | 100 | 100 | 100 | 100 | 100 |
|  |  | Hydroxyl value [mgKOH/g] |  | 24.2 | 24.2 | 144.9 | 72.5 | 72.5 |
|  | Polyfunctional blocked isocyanate compound (B) [parts by weight] | Diethyl malonate blocked isocyanate | Duranate MF-K60B | 27.8 |  | 83.5 | 8.4 | 125.3 |
|  |  | Dimethylpyrazole blocked isocyanate | Desmodur BL3575/1 |  | 17.3 |  |  |  |
|  |  | NCO/OH ratio |  | 1.0 | 1.0 | 0.5 | 0.1 | 1.5 |
|  | Surfactant (C) [parts by weight] | Anion-based (C-1) | Fluorine-based Ftergent 100 |  | 5.0 |  | 5.0 | 5.0 |
|  |  |  | Surflon S211 | 5.0 |  | 5.0 |  |  |
|  |  | Cation-based (C-2) | Nissan cation 2DB500E | 0.5 |  |  |  |  |
|  |  |  | Nissan cation BB |  |  | 0.50 | 0.50 | 0.50 |
|  |  |  | Nissan cation AR-4 |  | 0.5 |  |  |  |
|  |  |  | Ftergent 300 |  | 1.0 |  |  |  |
| Performance | Catalyst [parts by weight] | Dibutyl tin dilaurate |  |  |  |  |  |  |
|  |  | Antifogging performance | Sustainability test | A | B | A | A | B |
|  |  |  | Steam test | A | A | A | A | A |
|  |  |  | Steam test after moisture resistance test | A | A | A | A | A |
|  |  |  | Steam test after heat resistance test | A | A | A | A | A |
|  |  | Stain of water drip |  | C | B | A | C | A |
|  |  | Adhesiveness |  | A | A | B | A | A |
|  |  | Water resistance |  | C | B | A | C | A |

Note that the abbreviated notation of each material in Table 6 will be described later.

As shown in Table 6, in each of the examples 2-22 to 2-26, favorable performance of the antifogging film was confirmed.

From the results of the examples of 2-23 and 2-26, it was seen that sustainability of antifogging performance of the antifogging film tended to be slightly reduced in the case where the amount of the monomer (A-2) was large and the amounts of the monomer (A-1) and the monomer (A-3) were small, or where the amount of the polyfunctional blocked isocyanate compound (B) was large.

From the results of the examples 2-22, 2-23, and 2-25, it was seen that a stain of a water drip on the antifogging film tended to be conspicuous in the case where the amount of the monomer (A-1) was large and the amounts of the monomer (A-2) and the monomer (A-3) were small, where the amount of the monomer (A-2) was large and the amounts of the monomer (A-1) and the monomer (A-3) were small, or where the amount of the polyfunctional blocked isocyanate compound (B) was small.

From the result of the example 2-24, it was seen that the adhesiveness of the antifogging film in the antifogging film specimen tended to be slightly reduced in the case where the amount of the monomer (A-3) was large.

From the results of the examples 2-22, 2-23, and 2-25, it was seen that water resistance of the antifogging film tended to be slightly reduced in the case where the amount of the monomer (A-1) was large and the amounts of the monomer (A-2) and the monomer (A-3) were small, where the amount of the monomer (A-2) was large and the amounts of the monomer (A-1) and the monomer (A-3) were small, or where the amount of the polyfunctional blocked isocyanate compound (B) was small.

5. Comparative Example

Table 7 shows the composition (parts by weight) of antifogging agent compositions according to comparative examples 1 to 6 and evaluation results of performance of antifogging film specimens in which an antifogging film is formed by the antifogging agent composition. Antifogging film specimens according to the comparative examples 1 to 6 were prepared with the same method as that described above.

TABLE 7

|  |  |  |  | Comparative example |  |  |  |  |  |
|---|---|---|---|---|---|---|---|---|---|
|  |  |  |  | 1 | 2 | 3 | 4 | 5 | 6 |
| Antifogging agent composition | Copolymer (A) [parts by weight] | Monomer (A-1) | DMAA | 50 | 50 | 50 | 50 | 50 | 50 |
|  |  | Monomer (A-2) | BA (C4) | 35 | 35 | 35 | 35 | 35 | 35 |
|  |  | Monomer (A-3) | HEA | 15 | 15 | 15 | 15 | 15 | 15 |
|  |  | Total monomer |  | 100 | 100 | 100 | 100 | 100 | 100 |
|  |  | Hydroxyl value [mgKOH/g] |  | 72.5 | 72.5 | 72.5 | 72.5 | 72.5 | 72.5 |
|  | Polyfunctional blocked isocyanate compound (B) | Diethyl malonate blocked isocyanate | Duranate MF-K60B | 83.5 | 83.5 | 83.5 | 83.5 | 83.5 | 83.5 |

TABLE 7-continued

|  |  |  |  | Comparative example | | | | | |
|---|---|---|---|---|---|---|---|---|---|
|  |  |  |  | 1 | 2 | 3 | 4 | 5 | 6 |
|  | [parts by weight] | NCO/OH ratio |  | 1.0 | 1.0 | 1.0 | 1.0 | 1.0 | 1.0 |
|  | Surfactant (C) | Anion-based | Rapisol A80 | 10.0 |  |  |  |  |  |
|  | [parts by weight] | (C-1) Fluorine-based | Surflon S211 |  | 10.0 |  |  | 10.0 |  |
|  |  | Cation-based (C-2) | Nissan cation BB |  |  | 3.0 |  |  | 3.0 |
|  |  | Nonion-based (C-3) | Noigen EA-140 |  |  |  | 3.0 | 3.0 | 3.0 |
| Performance | Antifogging preformance | Sustainability test |  | D | D | D | D | D | D |
|  |  | Steam test |  | A | A | A | A | A | A |
|  |  | Steam test after moisture resistance test |  | A | A | A | A | A | A |
|  |  | Steam test after heat resistance test |  | A | A | C | A | A | A |
|  | Stain of water drip |  |  | C | C | C | C | C | C |
|  | Adhesiveness |  |  | A | A | A | A | A | A |
|  | Water resistance |  |  | A | A | A | A | A | A |

Note that the abbreviated notation of each material in Table 7 will be described later.

Antifogging agent compositions according to the comparative example 1 and 2 contain no cationic surfactant (C-2) unlike the embodiments of the present invention. As a result, sufficient sustainability of antifogging performance was not achieved in antifogging films according to the comparative examples 1 and 2. Further, a stain of a water drip on the antifogging films according to comparative examples 1 and 2 was conspicuous.

The antifogging agent composition according to the comparative example 3 contains no anionic surfactant (C-1) unlike the embodiments of the present invention. As a result, sufficient sustainability of antifogging performance was not achieved in an antifogging film according to the comparative example 3. Further, antifogging performance of the antifogging film according to comparative example 3 after the heat resistance test was slightly low, and a stain of a water drip on the antifogging film was conspicuous.

In an antifogging agent composition according to the comparative example 4, a nonionic surfactant (C-3) is used instead of the anionic surfactant (C-1) and the cationic surfactant (C-2) unlike the embodiments of the present invention. As a result, sufficient sustainability of antifogging performance was not achieved in an antifogging film according to the comparative example 4. Further, antifogging performance of the antifogging film according to the comparative example 4 after the heat resistance test was slightly low, and a stain of a water drip on the antifogging film was slightly conspicuous.

In an antifogging agent composition according to the comparative example 5, the nonionic surfactant (C-3) is used instead of the cationic surfactant (C-2) unlike the embodiments of the present invention. As a result, sufficient sustainability of antifogging performance was not achieved in an antifogging film according to the comparative example 5. Further, a stain of a water drip on the antifogging film according to the comparative example 5 was conspicuous.

In an antifogging agent composition according to the comparative example 6, the nonionic surfactant (C-3) is used instead of the anionic surfactant (C-1) unlike the embodiments of the present invention. As a result, sufficient sustainability of antifogging performance was not achieved in an antifogging film according to the comparative example 6. Further, antifogging performance of the antifogging film according to the comparative example 6 after the heat resistance test was slightly low, and a stain of a water drip on the antifogging film was slightly conspicuous.

6. Abbreviated Notation of Material

Names corresponding to the abbreviated notation of each material used in Tables 1 to 7 will be collectively described below.

(6-1) Monomer (A-1)
DMAA: N,N-dimethyl acrylamide
DEMA: N,N-diethyl methacrylamide
IPAA: N-isopropyl acrylamide
DAAA: diacetone acrylamide
DMAPAA: dimethylaminopropyl acrylamide
ACMO: N-acryloylmorpholine (6-2) Monomer (A-2)
MMA: methyl methacrylate
BA: n-butyl acrylate
CHA: cyclohexyl acrylate
CA: cetyl acrylate (6-3) Monomer (A-3)
HEA: 2-hydroxy ethyl acrylate
HEMA: 2-hydroxy ethyl methacrylate
HEAA: hydroxy ethyl acrylamide
Placcel FA2D: caprolactone 2 mol adduct of 2-hydroxy ethyl acrylate
Placcel FA5: caprolactone 5 mol adduct of 2-hydroxy ethyl acrylate (6-4) Polyfunctional Blocked Isocyanate Compound (B)
Duranate MF-K60B: malonate blocked isocyanate [trade name: Duranate MF-K60B manufactured by Asahi Kasei Chemicals Corporation]
Desmodur BL3575/1: dimethylpyrazole blocked isocyanate [trade name: Desmodur BL3575/1 manufactured by Sumika Bayer Urethane Co., Ltd.]
Sumidur BL3175: methyl ethyl ketoxime blocked isocyanate [trade name: Sumidur BL3175 manufactured by Sumika Bayer Urethane Co., Ltd.]

(6-5) Anionic Surfactant (C-1)
Ftergent 100: fluorine-containing sulfonate
Surflon 5211: fluorine-containing carboxylate
Rapisol A80: diester sulfosuccinate
Persoft SK: alkyl sulfonate (6-6) Cationic Surfactant (C-2)
Nissan cation 2DB500E: dialkyl quaternary ammonium salt
Nissan cation BB: monoalkyl quaternary ammonium salt
Nissan cation AR-4: imidazoline salt
Ftergent 300: fluorine-containing cationic surfactant (6-7) Nonionic Surfactant (C-3)
Noigen EA-140: polyoxyethylene alkyl phenyl ether

[Others]

Although embodiments of the present invention have been described, the embodiments of the present invention are not limited to the above-mentioned embodiments and it goes without saying that various modifications can be made without departing from the essence of the present invention.

The invention claimed is:

1. An antifogging agent composition, comprising:
a copolymer (A);
a polyfunctional blocked isocyanate compound (B); and
a surfactant (C), wherein
the copolymer (A) is formed of a monomer (A-1) represented by a following general formula (1) or (2), a monomer (A-2) represented by a following general formula (3), and a monomer (A-3) represented by a following general formula (4) or (5),

[Chem. 1]

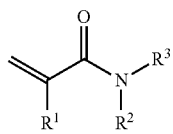

(1)

(In the general formula (1), $R^1$ represents a hydrogen atom or a methyl group, $R^2$ represents a $C_1$ to $C_4$ straight chain or branched alkyl group, $-C(CH_3)_2CH_2COCH_3$, $-C_2H_4N(CH_3)_2$, or $-C_3H_6N(CH_3)_2$, and $R^3$ represents a hydrogen atom or a $C_1$ to $C_4$ straight chain or branched alkyl group)

[Chem. 2]

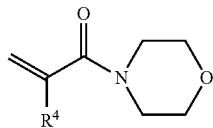

(2)

(In the general formula (2), $R^4$ represents a hydrogen atom or a methyl group)

[Chem. 3]

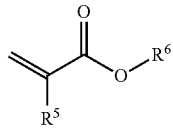

(3)

(In the general formula (3), $R^5$ represents a hydrogen atom or a methyl group and $R^6$ represents a $C_1$ to $C_{16}$ straight chain, branched, or cyclic alkyl group)

[Chem. 4]

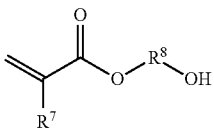

(4)

(In the general formula (4), $R^7$ represents a hydrogen atom or a methyl group and $R^8$ represents a $C_2$ to $C_4$ straight chain or branched alkylene group or $-C_2H_4(OCO(CH_2)_5)n-$ (n=1 to 5))

[Chem. 5]

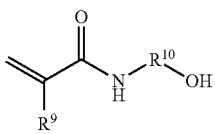

(5)

(In the general formula (5), $R^9$ represents a hydrogen atom or a methyl group and $R^{10}$ represents a $C_1$ to $C_4$ straight chain or branched alkylene group),
a content of the monomer (A-1) is 35 to 90 parts by weight, a content of the monomer (A-2) is 5 to 60 parts by weight, and a content of the monomer (A-3) is 5 to 30 parts by weight per a total content of 100 parts by weight of the monomer (A-1), the monomer (A-2), and the monomer (A-3),
an NCO/OH ratio obtained by dividing an isocyanate group content (NCO) of the polyfunctional blocked isocyanate compound (B) by a hydroxyl group content (OH) of the copolymer (A) is within a range from 0.1 to 1.5, and
the surfactant (C) includes an anionic surfactant (C-1) and a cationic surfactant (C-2), a content of the anionic surfactant (C-1) being 1.00 to 10.0 parts by weight per 100 parts by weight of the copolymer (A), a content of the cationic surfactant (C-2) being 0.01 to 3.00 parts by weight per 100 parts by weight of the copolymer (A).

2. The antifogging agent composition according to claim 1, wherein
the anionic surfactant (C-1) is a fluorochemical surfactant.

3. An antifogging article, comprising:
a substrate; and
an antifogging film formed by heating and curing the antifogging agent composition according to claim 1 applied to the substrate.

4. An antifogging article, comprising:
a substrate; and
an antifogging film formed by heating and curing the antifogging agent composition according to claim 2 applied to the substrate.

* * * * *